United States Patent Office 3,271,380
Patented Sept. 6, 1966

3,271,380
PROCESS FOR CATALYST RESIDUE REMOVAL
Richard E. Dietz, Bartlesville, Okla., assignor to Phillips Petroleum Company, a corporation of Delaware
No Drawing. Filed Apr. 1, 1963, Ser. No. 269,769
15 Claims. (Cl. 260—93.7)

This invention relates to the removal of catalyst residues from polymers. In one aspect, this invention relates to the removal of catalyst residues by utilizing a halogenated epoxide treatment of a polymer. In another aspect, this invention relates to the removal of catalyst residues by utilizing a combination of a halogenated epoxide and a dicarbonyl compound as a treating agent for the polymer. A further aspect of this invention relates to the removal of catalyst residues by utilizing a combination of a halogenated epoxide and a solid adsorbent bed treatment of a polymer. A still further aspect of this invention relates to the removal of catalyst residues by utilizing a combination of a halogenated epoxide, a dicarbonyl compound and a sorbent bed treatment of the polymer.

Various reactions for polymerizing olefins are described in literature, and the polymerizations usually are carried out in the presence of a catalyst. One such procedure for the production of olefin polymers involves contacting the monomer(s) with a catalyst system comprising a compound of a metal of Group IV, V, VI or VIII and a compound selected from the group consisting of organometal compounds, metal hydrides and metals of Group I, II or III of the Periodic System. One of the problems encountered with polymers prepared by such processes concerns the presence of catalyst residues, or ash-forming ingredients, in the polymer. The "ash content" refers to the inorganic constitutes which are present in the polymer in unidentified form and which produce ash when the polymer is burned. The presence of these catalyst residues in the polymer adversely affects the color and heat stability of the polymer as well as its electrical proporties. In addition, where metal halides are present in the catalyst, the use of a treating agent such as dicarbonyl compounds containing the group

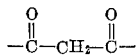

results in reaction of the treating agent with the metal halide with the evolution of a hydrogen halide. This is most usually hydrogen chloride since metal chlorides are usually employed as catalyst. HCl generation can lead to significant operating problems, especially in commercial equipment, in the nature of corrosion of conduits and vessels. Moreover, only moderate rates of extraction of catalyst residues are obtained when dicarbonyl-type chelating agents are used to sequester the catalyst residues. Also, it is believed that, at least in some instances, the presence of hydrogen chloride may tend to inhibit the chelating reaction.

It is thus an object of the present invention to provide an improved process for producing polymers of olefins having a low ash content.

Another object of the present invention is to provide a process for treating polymers to remove catalyst residues associated therewith.

Another object of the invention is to provide a process for polymerizing olefins wherein the polymerization effluent containing liquid monomer and polymer in suspension is treated to remove catalyst residues.

A further object of the invention is to provide a method for removing catalyst residues from a polymer wherein a halogen is a part of the catalyst complex.

A still further object of the invention is to provide a process for treating a stream containing polymer to remove catalyst residues without inhibition of the removal by undesirable hydrogen halides.

Other objects, aspects and the several advantages of the invention will be apparent to those skilled in the art in view of the following disclosure and the appended claims.

In accordance with the presence invention, I have now discovered that a major portion of the metallic catalyst residues contained in olefin polymers can be removed by treatment with (a) a halogen-containing epoxide having the general formula

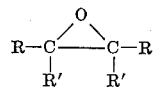

wherein R and R' are selected from the group consisting of hydrogen and the nonsubstituted, epoxy-substituted, and halogen-substituted alkyl, cycloalkyl, aryl, alkylcycloalkyl, cycloalkylalkyl, alkaryl, aralkyl, cycloalkylaryl, and arylcycloalkyl radicals; R and R' can be joined to form carbocyclic groups; and the molecule contains 2 to 20 carbon atoms, 1 to 3 halogen atoms, and 1 to 3 oxygen atoms; (b) the halogen-containing epoxides of (a) plus a dicarbonyl compound containing the group

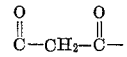

(c) the halogen-containing epoxides of (a) plus a solid adsorbent bed; or (d) the combination of the compounds of (b) and a solid adsorbent bed.

By the method of this invention the polymer is contacted with the halogen-containing epoxide in a hydrocarbon slurry in an amount of from 1 to 5 times the stoichiometric amount calculated on the basic of $n$ gram mols of treating agent per gram atom of total metal in the catalyst charged, where $n$ is the valence of the metal(s) in the catalyst, after which the system is heated to a temperature in the range of between 100 and 200° F. for from 0.25 to 5.0 hours. When the hydrocarbon diluent is the polymerization monomer, such as for example propylene, the temperature obviously will not exceed the critical temperature thereof.

Frequently it may be desirable to drain residual monomer and/or other diluent from the system, wash the polymer with hydrocarbon, and treat the washed polymer in clean hydrocarbon, e.g. in additional monomer. By so operating, the amount of treating agent will be substantially reduced since soluble residues in the diluent are removed prior to treatment.

When a dicarbonyl-containing compound is used in conjunction wtih the halogen-containing epoxide treatment, the dicarbonyl compound is combined with the halogen-containing epoxide compound, which acts as an adjuvant for the dicarbonyl chelator. In many instances, the amount of chelating agent necessary to reduce catalyst residues to acceptable levels can be reduced; thus the adjuvant operates to enhance the effectiveness of the chelating agent, in one aspect by acting as a scavenger for the hydrogen halides liberated from the reaction of catalyst with the chelating agents. When a diketone and a halogen-containing epoxide are used together, the diketone is used in an amount of from 1 to 5 times the stoichiometric amount calculated on the basis of $m/2$ gram mols of diketone per gram atom of total metal, where $m$ is the coordination number of the metal(s) in the catalyst, and the halogen-containing epoxide is used in an amount of from 1 to 5 times the stoichiometric amount calculated on the basic of one gram mol of halogen-containing epoxide per gram atom of halogen in the catalyst.

When an adsorbent bed is used in conjunction with either the epoxide compound alone or the combination of epoxide and a dicarbonyl compound, a small quantity of epoxide or of epoxide plus diketone, calculated as indicated above, is mixed with the polymer solution by stirring the mixture for about 0.25 to 5.0 hours at a temperature level at which the polymer remains in solution, generally in the range of 100 to 300° F., then passing the solution over a bed of an activated adsorbent, e.g. clay (bentonite, kaolinite, and the like), diatomaceous earth (kieselguhr and the like), bauxite, alumina, titania, magnesia, silica, activated carbon and the like, at a similarly elevated temperature. Prior to contacting with the halogen-containing epoxide-polymer solution, the adsorbent is activated by heating in a stream of air at a temperature in the range of 500–1000° F. for about 10 minutes to 6 hours and purging with nitrogen or other inert gases. Contact time of the solution with the adsorbent is in the range of about 1 to about 20 minutes. From the adsorbent treatment the solution is passed to a recovery zone where the polymer is isolated by suitable means such as by stripping or flashing to remove solvent therefrom.

The present invention is applicable to the treatment of polymers which are prepared by polymerizing olefinic compounds including mono-1-olefins and diolefins containing from 2 to 20 carbon atoms. Examples of such monomers include ethylene,
propylene,
1-butene,
1-pentene,
3-methyl-1-butene,
1-hexene,
1-heptene,
1-octene,
4-methyl-1-pentene,
3-methyl-1-hexene,
4-vinylcyclohexene,
1-eicosene,
4-ethyl-1-octadecene,
6-methyl-1-dodecene,
1,3-eicosadiene,
4,6-diethyl-1,3-decadiene,
4,5-dimethyl-1-octene,
1-hexadecene,
1,3-butadiene,
isoprene,
2,3-dimethylbutadiene, and the like.

It is to be understood that mixtures of two or more monomers can be employed in the polymerization to produce copolymers which are then treated by the present process. Examples of such copolymers include 1-butene-1-hexene and 1-butene-1-pentene.

This invention is applicable to the treatment of polymers prepared by the use of catalyst compositions which form on mixing two or more components, one of which is a compound of a metal selected from Groups IV, V, VI and VIII of the Periodic Table according to Mendeleef, the second component being selected from organometal compounds, metal hydrides and metals of Groups I, II and III of the Periodic Table. Numerous examples of these catalyst compositions are well known in the art.

Examples of the second-mentioned component which can be employed include n-butyllithium,
phenyllithium,
isobutylsodium,
ethylpotassium,
isooctylrubidium,
n-propylcesium,
dimethylberyllium,
ethylmagnesium bromide,
di-n-butylcalcium,
isobutylstrontium chloride,
cyclohexylbarium iodide,
dicyclopentylzinc,
n-propylzinc chloride,
p-tolylscandium dibromide,
diphenylscandium chloride,
trimethylyttrium,
trimethylaluminum,
triethylaluminum,
triisobutylaluminum,
tri-n-butylaluminum,
tri-n-pentylaluminum,
triisooctylaluminum,
tri-n-dodecylaluminum,
triphenylaluminum,
triethylgallium,
triphenylgallium,
tricyclohexylgallium,
tri-n-butylindium,
triethylthallium,
diethylaluminum hydride,
methylaluminum dichloride,
dimethylaluminum chloride,
ethylaluminum dichloride,
diethylaluminum chloride,
di-n-butylaluminum bromide,
isooctylaluminum diiodide,
di-n-propylgallium fluoride,
eicosylgallium dibromide,
ditetradecylgallium fluoride,
dicyclohexylgallium chloride,
diphenylgallium bromide,
diphenylindium chloride,
dioctylindium fluoride,
cyclohexylindium dibromide,
3-methylcyclohexylaluminum dichloride,
2-cyclohexylethylgallium dichloride,
p-tolylberyllium iodide,
di-(3-phenyl-1-methylpropyl)indium fluoride,
2-(3 - isopropylcyclohexyl)-ethylthallium dibromide, and the like.

The metal hydrides can include, as specific examples, aluminum hydride, lithium aluminum hydride, barium hydride, gallium hydride, indium hydride, sodium hydride, potassium beryllium hydride.

The metals of the first, second and third groups are applicable as a class, the most important members being sodium, magnesium, and aluminum.

The compounds of a metal of Groups IV, V, VI and VIII of the Periodic system include the oxides, hydrides, halides, oxyhalides and salts of organic acids, usually having 20 or less carbon atoms, such as formic acid, propionic acid, valeric acid, pelargonic acid, palmitic acid, arachidic acid, and the like, of the said groups of metals, such as titanium, zirconium, vanadium, tantalum, chromium, molybdenum, iron, cobalt and nickel.

The alcoholates of a metal of Group IV of the Periodic system which can be employed to conform to the formula $X_nM(OR)_m$, where $m+n$ equals the valence of the metal M, X is a halogen, and R is an organic radical usually having 20 or less carbon atoms, and preferably being an alkyl, cycloalkyl or aryl group, as specific examples:

titanium butoxide (tetra-n-butyl titanate),
tetra-sec-butyl titanate,
tetraisopropyl titanate,
tetra-2-ethylbutyl titanate,
tetra-2-ethylhexyl titanate,
tetrastearyl titanate,
tetracyclopentyl titanate,
tetraethyl zirconate,
tetramethyl zirconate,
tetraisopropyl zirconate,
tetraamyl zirconate,
dichloro diethyl titanate ($Cl_2Ti(OC_2H_5)_2$),
monochloro triethyl titanate ($ClTi(OC_2H_5)_3$),
and dichloro diethyl zirconate ($Cl_2Zr(OC_2H_5)_2$).
Also included are such compounds as $Hf(OCH_3)_4$, $Th(OC_3H_7)_4$, $Th(OC_6H_5)_4$, $Cl_3Ti(OC_6H_4CH_3)$, $Zr(OC_4H_7)_4$, $Cl_2Hf(OC_{10}H_{21}))_2$, $Th(OC_6H_{13})_4$, and $Zr(OC_{12}H_{25})_4$.

A third catalyst component which can be used advantageously is an organic halide or organometal halide where the organic radical has 30 or less carbon atoms and is advantageously an alkyl, cycloalkyl or aryl group. Specific examples are ethyl bromide, ethyl trichloro titanium, bromobenzene, cyclohexyl chloride. Also applicable are an alkali metal or ammonium halide, an aluminum halide (where the catalyst also includes another metal compound such as a titanium compound), a halogen, a hydrogen halide, a complex hydride, a mixture of an organic halide and a metal, and Grignard reagents.

A still more specific subgroup of catalysts where excellent color and low ash content are obtained by the practice of the invention include catalysts where an organometal compound is used in combination with a metal salt. The ratios of the catalyst components can vary widely, depending upon the particular charge used and operating conditions, from about 0.02 to 50 mols of the first component per mol of the second catalyst component. If a third component is present, the amount can vary from 0.02 to 50 mols per mol of the second component.

Examples of suitable catalyst systems in accordance with the foregoing disclosure are:

(a) Aluminum trialkyls, e.g. triethylaluminum or triisobutylaluminum and the tetravalent metal halides of the type represented by titanium tetrachloride;

(b) An organic halide (such as ethyl bromide), a Group IV inorganic halide (such as titanium tetrachloride), and a low valence metal selected from the group consisting of alkali metals, beryllium, magnesium, zinc, cadmium, mercury, aluminum, gallium, indium, and thallium, for example magnesium, ethyl bromide and titanium chloride, as such or with the addition of metallic aluminum;

(c) A Group IV halide, for example titanium tetrachloride, and a low valence metal identified in (b), for example sodium or magnesium;

(d) A mixture of titanium hydride and an aluminum halide, i.e., a mixture of titanium hydride and ethylaluminum sesquichloride;

(e) An organoaluminum halide such as diethylaluminum chloride and a trivalent metal halide such as titanium trichloride;

(f) A mixture of molybdenum pentachloride and organometal compounds and halides exemplified by triethylaluminum and ethylaluminum dichloride;

(g) A mixture of complex metal halides, exemplified by potassium fluotitanate, and an organometal compound and halides exemplified by triethylaluminum and diethylaluminum chloride;

(h) A mixture of a derivative selected from the oxides of molybdenum, alkali metal and ammonium molybdates, and an organometal halide exemplified by isobutylaluminum dichloride;

(i) A mixture of a derivative of iridium, platinum and osmium selected from the group consisting of halides, oxides and complex compounds of iridium, platinum and osmium, said complex compounds corresponding to the formula $M_xM'X_y$, wherein M is an alkali metal or an ammonium radical, M' is iridium, platinum or osmium, X is a halogen, and y is at least 1, and the sum of x and y is equal to the valence of M', and a metallic organic compound exemplified by triethylaluminum, for example iridium chloride and triethylaluminum or ethylaluminum sesquichloride;

(j) A mixture of a derivative of a Group VI metal selected from the group consisting of halides, oxyhalides, hydroxyhalides, oxyhydroxyhalides of a metal selected from the group consisting of chromium, molybdenum, tungsten, and polonium, and complex salts of said halides and said oxyhalides with a member selected from the group consisting of halides of sodium, potassium, lithium, rubidium, cesium, and ammonia and an organometal compound exemplified by triethylaluminum, for example molybdenum pentachloride and ethylaluminum dichloride;

(k) A chromyl halide and at least one of the following: (1) a metal hydride or an organometal compound, (2) an organometal halide, and (3) a mixture of an organic halide and a metal, for example chromyl chloride, ethyl bromide and magnesium;

(l) (1) A titanium derivative, (2) a complex hydride and (3) a halide of aluminum, for example tetrabutyl titanate, lithium aluminum hydride and aluminum chloride;

(m) At least one halide of titanium, zirconium or hafnium and at least one hydride of lithium, sodium, potassium, rubidium, cesium, magnesium, calcium, strontium, barium, lanthanum or thorium, for example zirconium tetrachloride and calcium hydride;

(n) (1) A hydrocarbon derivative of one of the metals zinc, cadmium, mercury and magnesium and (2) a member selected from the group consisting of halides of titanium, zirconium, vanadium and molybdenum, oxyhalides of titanium, zirconium, vanadium, molybdenum and chromium, and complex salts of said halides and oxyhalides with a member selected from the group consisting of halides of alkali metals and ammonia, for example diethylzinc and titanium tetrachloride;

(o) (1) A tri- or tetrahalide of titanium, zirconium, hafnium and germanium, (2) an organophosphorus-containing compound, and (3) at least one of the following: (a) an organometal halide, (b) a mixture of an organic halide and a metal, and (c) a complex hydride, for example triethylaluminum, titanium tetrachloride and triphenyl phosphine;

(p) (1) A tri- or tetrahalide of titanium, zirconium, hafnium and germanium, (2) a peroxide of the formula R'OOR' where R' is a hydrogen, alkyl, aralkyl, alkaryl, cycloalkyl, acyl, alkyne or aryl, and (3) at least one of the following: (a) an organometal halide, (b) a mixture of an organic halide and a metal, and (c) a complex hydride, for example ethylaluminum sesquichloride, titanium tetrachloride and benzoyl peroxide;

(q) (1) A tri- or tetrahalide of titanium, zirconium, hafnium and germanium, (2) a metal alkoxide, and (3) at least one of the following: (a) an organometal halide, (b) a mixture of an organic halide and a metal, and (c) a complex hydride, for example ethylaluminum sesquichloride, aluminum ethylate and titanium tetrachloride;

(r) (1) A halide of titanium, zirconium, hafnium or germanium, (2) a hydride selected from the group consisting of hydrides of aluminum, gallium, indium and thallium and complexes of said hydrides with alkali metal hydrides, and (3) an organic halide, for example titanium tetrachloride, lithium aluminum hydride and ethyl bromide;

(s) (1) A halide of titanium, zirconium, hafnium, or germanium, (2) carbides and acetylenic compounds, and (3) at least one of the following: (a) an organometal halide, (b) a mixture of an organic halide and a free metal, and (c) a complex hydride, for example ethylaluminum sesquichloride, titanium tetrachloride and copper acetylide.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal halide falls within the range of 0.02 to 50.

Although not essential, it is often desirable to carry out the polymerization in the presence of elemental hydrogen.

The halogen-containing epoxides used in the process of the present invention are compounds represented by the general formula:

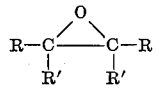

wherein R and R' are selected from the group consisting of hydrogen and the non-substituted, epoxy-substituted, and halogen-substituted alkyl, cycloalkyl, aryl, alkylcycloalkyl, cycloalkylalkyl, alkaryl, aralkyl, cycloalkylaryl, and arylcycloalkyl radicals; R and R' can be joined to form carbocyclic groups; and the molecule contains 2 to 20 carbon atoms, 1 to 3 halogen atoms, and 1 to 3 oxygen atoms. Examples of compounds that can be used are:

chloroethylene oxide,
epichlorohydrin (1-chloro-2,3-epoxypropane),
1-chloro-2,3-epoxybutane,
1-chloro-3,4-epoxybutane,
2-bromo-5,6-epoxyhexane,
3-fluoro-4,5-epoxyoctane,
1-iodo-7,8-epoxytridecane,
5-chloro-11,12-epoxyeicosane,
2,8-dichloro-5,6-epoxy-5,6,di-n-butyldecane,
5-chloro-1-ethyl-2-n-propyl-1,2-epoxycyclohexane,
3-chloro-5-bromo-1-phenyl-1,2-epoxypentane,
1,1'-epoxy-3-bromo-3'-chloro-dicyclopentyl,
1,3-epoxy-1(3-chlorocyclohexyl)-3-chloro-6-bromo-
    4,5-dimethylhexane,
1,1'-epoxy-3,4-epoxy-3',4'-epoxy-5,5'-dichloro-
    dicyclohexyl,
1-oxaspiro-4,5-dibromo(2.2)-pentane,
1-oxaspiro-5-iodo(2.3)hexane,
1,2-epoxy-3,5-difluorocyclopentane,
1,2-epoxy-4-chlorocyclohexane,
1-oxaspiro-5,6-epoxy-7-chloro(2.4)heptane,
1-oxaspiro-4,7-dichloro(2.5)octane,
1,2-epoxy-1(3-chlorophenyl)-2-phenylethane,
1,2-epoxy-1(3-chloronaphthyl)-2(3-bromophenyl)ethane,
1,2-epoxy-1(3-n-propylcyclohexyl)-1,2-diethyl-6-
    chlorohexane,
1-cyclopentyl-4,5-epoxy-7-bromooctane,
1,2-epoxy-1,2-dimethyl-1(3-chloro-5-n-butylphenyl)-
    4-iodopentane,
1-phenyl-4,5-epoxy-7-bromoheptane,
1(3-cyclopentylphenyl)-1,2-epoxy-4,6,8-trichlorononane,
1(2-naphthylcyclopentyl)3,4-epoxy-5-chloropentane, and the like.

The dicarbonyl compounds used with the adjuvants of this invention are those materials containing the group:

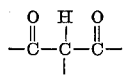

Such materials are those selected from the group consisting of (a) compounds of the general formula:

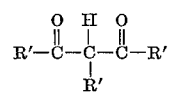

and (b) compounds of the general formula:

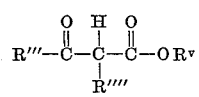

In compound (a) each R' can be alkyl, cycloalkyl, aryl, aralkyl, alkaryl, alkylcycloalkyl, or cycloalkylalkyl group or the R''s can be joined to form a cyclic structure and R'' can be hydrogen or an alkyl, cycloalkyl, aryl, alkaryl, aralkyl, alkylcycloalkyl, cycloalkylalkyl group, the number of carbon atoms in each R' and R'' being from 1 to 8.

In compound (b) R''' is an alkyl, cycloalkyl, aryl, aralkyl, alkaryl, alkylcycloalkyl, cycloalkylalkyl group or an OR$^v$ group; R'''' is hydrogen or a hydrocarbon group defined for R'''; and R$^v$ is a hydrocarbon group as defined for R''', the number of carbon atoms in R''', R'''', and R$^v$ being from 1 to 8.

Typical of such compounds are 2,4-pentanedione (acetylacetone),
2,4-hexanedione,
2,4-heptanedione,
5-methyl-2,4-hexanedione,
2,4-octanedione,
5,5-dimethyl-2,4-hexanedione,
3-ethyl-2,4-pentanedione,
2,2-dimethyl-3,5-nonanedione,
1-cyclohexyl-1,3-butanedione,
5-5-dimethyl-1,3-cyclohexanedione,
1-phenyl-1,3-butanedione,
1-(4-biphenylyl)-1,3-butanedione,
1-phenyl-1,3-pentanedione,
1-phenyl-5,5-dimethyl-2,4-hexanedione,
1,3-diphenyl-1,3-propanedione,
1,4-diphenyl-1,3-butanedione,
1-phenyl-2-benzyl-1,3-butanedione,
1-phenyl-3-benzyl-9,11-nonadecanedione,
8,10-heptadecanedione,
8-ethyl-7,9-heptadecanedione,
6-octyl-5,7-undecanedione,
4-phenyl-3,5-heptanedione,
1,3-cyclohexanedione,
ethyl acetoacetate,
methyl acetoacetate,
n-propyl acetoacetate,
isopropyl acetoacetate,
tert-butyl acetoacetate,
diethyl malonate,
dimethyl malonate,
di-n-propyl malonate,
diisopropyl malonate,
di-tert-butyl malonate,
octyl acetoacetate,
heptyl acetoacetate,
phenyl acetoacetate,
diphenyl malonate,
dicyclohexyl malonate,
dicyclohexyl octylmalonate,
dihexyl phenylmalonate,
ethyl 3-oxopentanoate,
octyl-3-oxoundecanoate,
methyl 3-oxo-4-phenylbutanoate,
ethyl 3-oxo-5-phenylpentanoate,
octyl 3-oxo-2-phenylundecanoate,
octyl 3-oxo-2-octylundecanoate,
cyclohexyl 3-oxo-6-cyclopentylhexanoate, and the like.

When necessary after continued use, the adsorbent employed in the process can be regenerated by heating at 500° F. or higher in the presence of a stream of air or oxygen. By so operating, organic materials are burned away and metals present are converted to oxides which are not detrimental to further use in the process.

The process of the invention is particularly adaptable to the treatment of polymers prepared in slurry-type mass polymerization, i.e., those in which a portion of the monomer serves as the diluent and the desirable polymer is not soluble therein at the reaction temperature. Suitable monomers of this type are propylene, 1-butene, 1-pentene, 1-hexene, and mixtures thereof. Catalyst systems suitable for such operations are broadly as set forth above. The presently preferred catalyst comprises a mixture of diethylaluminum chloride and titanium trichloride, the latter preferably have the approximate formula $$3TiCl_3 \cdot AlCl_3$$

and formed by reacting aluminum and titanium tetrachloride. Frequently it is desirable to conduct the polymerization in the presence of elemental hydrogen which serves as a control for molecular weight.

The process also is useful for the treatment of polymers of ethylene, propylene or copolymers of these monomers with each other or with other 1-olefins, the reaction being conducted as a solution operation in a suitable diluent such as cyclohexane at a temperature level such that the polymer product is obtained as a solution therein. Likewise, polymers of conjugated diolefins prepared in solution operations using heterogeneous catalyst systems of the class set forth above can be treated by the process of the invention to provide an essentially metal-free product.

In the preferred practice of the invention, the polymer is dispersed in a hydrocarbon diluent and treated in such dispersion. In many instances it is convenient to conduct the polymerization using the liquid monomer as the reaction diluent under conditions to provide a pulverulent solid polymer and to treat the polymer for removal of catalyst in this dispersant after termination of the polymerization. However, it is within the scope of the invention to replace the unreacted liquid monomer after polymerization has been terminated with another hydrocarbon material and to conduct the extraction step therein. In any case it is important to prevent contact of the system with air or moisture prior to and during the treating or extraction step. Extraction will be conducted in a temperature range such that the polymer will not be degraded and for a sufficient period of time to reduce the undesired impurities to an acceptable level. This time will vary with temperature, degree of mixing, etc., but will generally be from 1 minute to several hours, preferably from 10 to 100 minutes.

The treating agent can be introduced directly by itself into the contact zone, or it can be added in solution in a hydrocarbon which is inert to the reactants.

The polymer slurry can be passed to a filter, wherein the treated solid polymer is separated from the dispersant, the latter also containing the catalyst residues. To remove any adhering liquid, the polymer is washed on the filter, removed, and dried.

In a preferred embodiment of this invention, a polymer slurry, which has been treated according to the invention to extract catalyst residues, passes to a washing step wherein the solid polymer undergoes further purification comprising contacting the polymer particles countercurrently with a hydrocarbon which is maintained in the liquid phase, preferably the same olefin used in the polymerization. Various hydrocarbons, particularly paraffinic hydrocarbons containing from 3 to 7 carbon atoms per molecule, such as pentane or heptane, can be employed as the wash liquid although, as stated, it is preferred to utilize the monomer for this purpose.

The overhead stream recovered from the wash zone contains monomer, soluble polymer, catalyst residues and a small amount of solid polymer for further separation. This stream can be separated into its various components, if desired, and the purified monomer recycled. The bottom stream from the wash zone comprises a solid polymer substantially free of catalyst residues.

The present invention is particularly applicable to polypropylene prepared by polymerizing propylene in liquid propylene in the presence of a catalyst system comprising a reaction product of titanium tetrachloride and aluminum which can be represented by the approximate formula $3TiCl_3 \cdot AlCl_3$ together with diethylaluminum chloride, the polymerization being carried out at a temperature in the range between 100 and 160° F. While not essential, it is frequently desirable to conduct the polymerization in the presence of elemental hydrogen charged to the reactor prior to or in combination with the monomer charge.

While the method of this invention is particularly useful in treating dispersions of solid polymers to remove catalyst residues, it can also be employed to advantage to treat polymers in solution. In many polymerization systems, the reactor effluent comprises polymer in solution in a hydrocarbon solvent. Such a solution can be passed to a treating vessel wherein the extracting agent of this invention is added. The contact time is for a period sufficient to reduce the catalyst residues in the recovered polymer to an acceptable level, which may be from a few minutes up to several hours. After contacting in solution, the solution is passed through an adsorbent to remove the reaction product therefrom. The polymer is then precipitated from the solution by suitable means such as reducing the temperature, adding a coagulating agent, or the like. The polymer is separated from the liquid phase and can be further purified, if desired, by washing.

A more comprehensive understanding of the invention can be obtained by referring to the following illustrative examples, which are not intended, however, to be unduly limitative of the invention.

Example I

A run was made in a one-gallon stirred reactor in which propylene was polymerized in the presence of a catalyst obtained by mixing diethylaluminum chloride with a reaction product of titanium tetrachloride and aluminum containing 4.63 weight percent aluminum, 24.70 percent titanium, and 70.67 percent chlorine, the reaction being conducted at a temperature of 120° F. in the presence of hydrogen. At the end of the polymerization period a halogenated epoxide (epichlorohydrin) was added and the system maintained at extraction temperature for the time indicated, after which the unreacted propylene was removed and the polymer washed twice with 3 liters of liquid propylene, recovered and dried, after which titanium, aluminum, and total ash contents were determined. Data for this run are shown in Table I.

TABLE I

| | | |
|---|---|---|
| Polymerization: | | |
| Al-TiCl$_4$ Reaction Product, gm | | 0.420 |
| Diethylaluminum Chloride, gm | | 0.79 |
| Propylene, liters | | 3.0 |
| Hydrogen, mol percent (on propylene) | | 0.50 |
| Temperature, °F | | 120 |
| Time, hours | | 2 |
| Extraction: | | |
| Extractant— | | |
| Epichlorohydrin, gm | | 6.1 |
| x stoichiometric [a] | | 2.36 |
| Extraction— | | |
| Time, min | | 60 |
| Temperature, °F | | 160 |
| Rinse Time, min | | 30 |
| | Untreated Polymer | Treated Polymer |
| Analysis: | | |
| Titanium, p.p.m | 450 | 27 |
| Aluminum, p.p.m | 845 | 25 |
| Ash, p.p.m | 1,300 | 138 |

[a] Stoichiometric amount calculated on the basis of three gram mols of extractant per gram atom of total metal.

These data show that substantial reduction in catalyst contaminants is effected by treating the polymer with a halogen-containing epoxide.

Example II

A run was made in which propylene was polymerized as in Example I. At the end of the polymerization period a halogenated epoxide (epichlorohydrin) and a dicarbonyl-containing compound (acetylacetone) were added and the system maintained at extraction temperature for the time indicated, after which the unreacted propylene was removed and the polymer washed twice with 3 liters of liquid propylene, recovered and dried, after which titanium, aluminum and total ash were determined. Data for this run are shown in Table II.

TABLE II

| Polymerization: | | |
| --- | --- | --- |
| Al-TiCl₄ Reaction Product, gm | | 0.427 |
| Diethylaluminum Chloride, gm | | 0.80 |
| Propylene, liters | | 3.0 |
| Hydrogen, mol percent (on propylene) | | 0.50 |
| Temperature, °F | | 120 |
| Time, hours | | 2 |
| Extraction: | | |
| Extractants— | | |
| Epichlorohydrin, gm | | 3.1 |
| x stoichiometric a | | 2.2 |
| Acetylacetone, gm | | 6.0 |
| x stoichiometric b | | 2.1 |
| Extraction— | | |
| Time, min | | 60 |
| Temperature, °F | | 140 |
| Rinse time, min | | 30 |
| | Untreated Polymer | Treated Polymer |
| Analysis: | | |
| Titanium, p.p.m | 445 | 2 |
| Aluminum, p.p.m | 850 | 2 |
| Ash | 1,300 | 12 | a Stoichiometric amount calculated on the basis of one gram mol of extractant per gram atom of total chlorine.
b Stoichiometric amount calculated on the basis of three gram mols of extractant per gram atom of total metal.

These data show that substantial reduction in catalyst contaminants is effected by treating the polymer with a mixture of a halogen-containing epoxide and a dicarbonyl compound.

*Example III*

An untreated polymer prepared as in Example I was dissolved in normal heptane at a temperature of 200° F. together with 2.0 stoichiometric equivalents of 1-chloro-2,3-epoxybutane. This solution was stirred for 15 minutes and then passed through an adsorbent bed containing ⅛-inch activated alumina pellets at a temperature of 200° F. and a flow rate of 10 volumes of solution per volume of alumina per hour. The treated solution was then cooled and the polymer separated by filtration, washed on the filter with normal pentane, and dried, after which titanium, aluminum and total ash were determined. Substantial reduction in these catalysts contaminants was effected by treating the polymer with a halogen-containing epoxide followed by a solid adsorbent bed.

*Example IV*

An untreated polymer prepared as in Example I was dissolved in normal heptane at a temperature of 200° F. together with 1.5 stoichiometric equivalents of 2-bromo-5,6-epoxyhexane and 2.0 equivalents of 2,4-heptanedione. This solution was stirred for 15 minutes and then passed through an adsorbent bed containing 20–40 mesh activated clay at a temperature of 200° F. and a flow rate of 15 volumes of solution per volume of clay per hour. The treated solution was then cooled and the polymer separated by filtration, washed on the filter with normal pentane, and dried, after which titanium, aluminum and total ash were determined. Substantial reduction in these catalyst contaminants was effected by treating the polymer with a halogen-containing epoxide and a dicarbonyl compound, acetylacetone, followed by a solid adsorbent bed, bauxite.

Reasonable variations and modifications can be made, or followed, in the light of the foregoing disclosure without departing from the spirit or scope thereof.

I claim:

1. A method of removing catalyst residues from a polymer prepared by catalytic polymerization in the presence of a catalyst which forms on commingling at least two essential components, one of said components being a metal compound selected from the group consisting of Groups IV, V, VI and VIII metal compounds and another of said components being selected from the group consisting of organometals, metal hydrides and metals of Groups I, II and III, which comprises treating said polymers with an agent selected from the group consisting of (A) a halogen-containing alkylene oxide of the formula

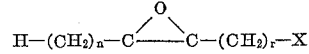

wherein X is a halogen, $n$ is an integer from 0 to 10 and $r$ is an integer from 1 to 10; (B) a halogen-containing alkylene oxide according to (A) and a dicarbonyl compound selected from those of the formulas

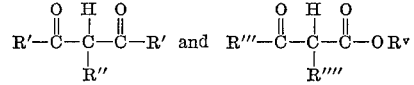

wherein $R'$ is a member of the group consisting of alkyl, cycloalkyl, aryl, aralkyl, alkaryl, alkylcycloalkyl and cycloalkylalkyl and wherein the $R''$s can be joined to form a cyclic structure; $R''$ is a member of the group consisting of hydrogen, alkyl, cycloalkyl, aryl, alkaryl, aralkyl, alkylcycloalkyl and cycloalkylalkyl; $R'''$ is a member selected from the group consisting of alkyl, cycloalkyl, aryl, aralkyl, alkaryl, alkylcycloalkyl, cycloalkylalkyl and an $OR^v$ group; $R''''$ is a member of the group consisting of hydrogen, alkyl, cycloalkyl, aryl, arylkyl, alkaryl, alkylcycloalkyl and cycloalkylalkyl; and $R^v$ is a member selected from the group consisting of alkyl, cycloalkyl, aryl, aralkyl, alkaryl, alkylcycloalkyl and cycloalkylalkyl, and wherein each of said $R'$, $R''$, $R'''$, $R''''$ and $R^v$ contains from 1 to 8 carbon atoms; and recovering the thus treated polymer from the solution thereof substantially free of catalyst residues.

2. A process according to claim 1 wherein the resulting treated polymer solution is passed over an activated adsorbent prior to recovering the treated polymer from the solution thereof substantially free of catalyst residues.

3. A method of removing catalyst residues from a polymer prepared by catalytic polymerization in the presence of a catalyst which forms on commingling at least two essential components, one of said components being a metal compound selected from the group consisting of Groups IV, V, VI and VIII metal compounds and another of said components being selected from the group consisting of organometal compounds, metal hydrides and metals of Groups I, II and III, which consists of contacting said polymer present in a hydrocarbon diluent maintained liquid under the conditions of the contacting step with a treating agent comprising a halogen-containing alkylene oxide of the formula

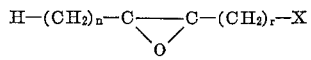

wherein X is a halogen, $n$ is an integer from 0 to 10 and $r$ is an integer from 1 to 10, at a temperature such that the polymer will not be degraded for a time ranging from between 10 and 100 minutes, and recovering the thus treated polymer from the contact step substantially free of catalyst residues.

4. In a process for the removal of catalyst residues from polymers wherein liquid mono-1-olefins are contacted with a catalyst comprising an organometal compound and a metal salt under polymerization conditions so as to form solid polymers in particle form and wherein an effluent containing solid polymers, liquid unreacted olefin, and catalyst residues is recovered from said polymerization, the improvement which comprises introducing said effluent into a contact zone; mixing said effluent in said contact zone with a treating agent comprising a halogen-containing alkylene oxide of the formula

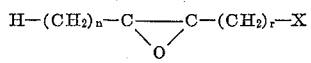

wherein X is a halogen, $n$ is an integer from 0 to 10, and $r$ is an integer from 1 to 10, under conditions such that said olefin remains in liquid phase; recovering the thus treated effluent; washing said treated effluent; and thereafter recovering a solid polymer substantially free of catalyst residues.

5. In a process for the removal of catalyst residues from polymers wherein a liquid mono-1-olefin is contacted with a catalyst obtained by mixing an alkylaluminum halide with the reaction product of a titanium halide and aluminum under polymerization conditions so as to form solid polymer in particle form and wherein an effluent containing solid polymer, liquid unreacted olefin and catalyst residues is recovered from said polymerization, the improvement which comprises introducing said effluent into a contact zone, mixing said effluent in said contact zone with epichlorohydrin under conditions such that said olefin remains in liquid phase, recovering the thus treated effluent, washing the said treated effluent by contacting same in countercurrent flow with a hydrocarbon under conditions such that said hydrocarbon and said unreacted olefin remain in liquid phase, and thereafter recovering a solid polymer substantially free of catalyst residues.

6. The process according to claim 5 wherein said mono-1-olefin is propylene.

7. A method of removing impurities from a polymer prepared by catalytic polymerization in the presence of a catalyst which forms on mixing at least two essential components, one of said components being a metal compound selected from the group consisting of Groups IV, V, VI and VIII metal compounds and another of said components being selected from the group consisting of organometal compounds, metal hydrides and metals of Groups I, II and III, at least one of said components containing at least one halogen atom attached to a metal atom, which comprises contacting said polymer present in a hydrocarbon diluent, while the latter is under conditions such that said diluent remains in liquid phase, with a treating agent comprising a dicarbonyl compound and a halogen-containing alkylene oxide of the formula

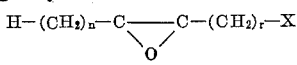

wherein X is a halogen, $n$ is an integer from 0 to 10, and $r$ is an integer from 1 to 10, and separating said polymer from the resulting mixture substantially free of catalyst residues.

8. The process according to claim 7 wherein said dicarbonyl compound comprises a member selected from the group consisting of the following structural formulas:

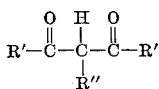

and

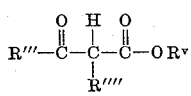

in which R' is a member of the group consisting of alkyl, cycloalkyl, aryl, aralkyl, alkaryl, alkylcycloalkyl and cycloalkylalkyl and wherein the R"s can be joined to form a cyclic structure; R" is a member of the group consisting of hydrogen, alkyl, cycloalkyl, aryl, alkaryl, aralkyl, alkylcycloalkyl and cycloalkylalkyl; R''' is a member of the group consisting of alkyl, cycloalkyl, aryl, aralkyl, alkaryl, alkylcycloalkyl, cycloalkylalkyl and an $OR^v$ group; R'''' is a member of the group consisting of hydrogen, alkyl, cycloalkyl, aryl, aralkyl, alkaryl, alkylcycloalkyl and cycloalkylalkyl; and $R^v$ is a member selected from the group consisting of alkyl, cycloalkyl, aryl, aralkyl, alkaryl, alkylcycloalkyl and cycloalkylalkyl and wherein each of said R', R", R''', R'''' and $R^v$ contains from 1 to 8 carbon atoms.

9. A method of removing impurities from a polymer prepared by catalytic polymerization in the presence of a catalyst formed on mixing at least two essential components, one of said components being a metal compound selected from the group consisting of Groups IV, V, VI and VIII metal compounds, and another of said components being selected from the group consisting of organometal compounds, metal hydrides and metals of Groups I, II and III, and at least one of said components containing at least one halogen atom attached to a metal atom, which comprises contacting said polymer dispersed in a hydrocarbon diluent, while the latter is under conditions such that said diluent remains in liquid phase, with a treating agent comprising a dicarbonyl compound selected from the group consisting of the following structural formulas:

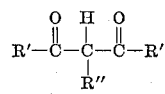

and

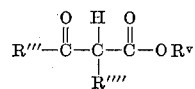

in which each R' is a member of the group consisting of alkyl, cycloalkyl, aryl, aralkyl, alkaryl, alkylcycloalkyl and cycloalkylalkyl and wherein the R"s can be joined to form a cyclic structure; R" is a member of the group consisting of hydrogen, alkyl, cycloalkyl, aryl, alkaryl, aralkyl, alkylcycloalkyl and cycloalkylalkyl; R''' is a member of the group consisting of alkyl, cycloalkyl, aryl, aralkyl, alkaryl, alkylcycloalkyl, cycloalkylalkyl and an $OR^v$ group; R'''' is a member of the group consisting of hydrogen, alkyl, cycloalkyl, aryl, aralkyl, alkaryl, alkylcycloalkyl and cycloalkylalkyl; and $R^v$ is a member selected from the group consisting of alkyl, cycloalkyl, aryl, aralkyl, alkaryl, alkylcycloalkyl and cycloalkylalkyl, and the number of carbon atoms in each R', R", R''', R'''' and $R^v$ is from 1 to 8; and an adjuvant comprising a halogen-containing alkylene oxide selected from a member of compounds of the formula

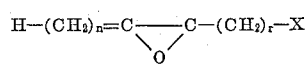

wherein X is a halogen, $n$ is an integer from 0 to 10, and $r$ is an integer from 1 to 10, and separating said polymer from the resulting mixture substantially free of catalyst residues.

10. In a polymer recovery process wherein propylene is contacted with a catalyst comprising a mixture of an organometal compound and a metal halide under polymerization conditions so as to form solid polymers in particle ene, catalyst residues and propylene is recovered from said form and wherein an effluent containing solid polypropyl- polymerization, the improvement which comprises introducing said effluent into a contact zone; mixing said effluent in said contact zone with a chelating agent comprising ethylacetoacetate and an adjuvant comprising epichlorohydrin under conditions such that said effluent remains in the liquid phase; recovering the thus treated effluent; washing said treated effluent by contacting same in countercurrent flow with a hydrocarbon having from 3 to 7 carbon atoms under conditions such that said hydrocarbon and said olefins remain in liquid phase; and thereafter recovering a solid polymer substantially free of catalyst residues.

11. A method of removing catalyst residues from a polymer prepared by catalystic polymerization in the presence of a catalyst which forms on commingling at least two essential components, one of said components being a metal compound selected from the group consisting of Groups IV, V, VI and VIII metal compounds and another of said components being selected from the group consisting of organometals, metal hydrides and metals of Groups I, II and II, which comprises treating said polymers present in solution with a halogen-containing alkylene oxide of the formula

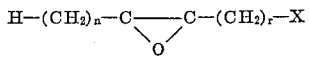

wherein X is a halogen, $n$ is an integer of from 0 to 10, and $r$ is an integer from 1 to 10, at a temperature such that the polymer will not be degraded for a time ranging from 5 to 120 minutes, passing the resulting treated polymer solution over a bed of activated adsorbent, and recovering the thus treated polymer from the solution substantially free of catalyst residues.

12. In a process for the removal of catalyst residues from polymers wherein liquid mono-1-olefins are contacted with a catalyst formed on mixing a titanium halide, an alkylaluminum halide and an aluminum halide under polymerization conditions so as to form polymers in solution form and wherein an effluent containing solution polymer, liquid unreacted olefin and catalyst residues is recovered from said polymerization, the improvement comprising introducing said effluent into a contact zone, mixing said effluent in said contact zone with epichlorohydrin under conditions such that said olefin remains in liquid phase, passing said resulting solution through an adsorption bed selected from the group consisting of bauxite and alumina, and thereafter recovering polymer substantially free of catalyst residues.

13. A method of removing impurities from a polymer prepared by catalytic polymerization in the presence of a catalyst which forms on mixing at least two essential components, one of said components being a metal compound selected from the group consisting of Groups IV, V, VI and VIII metal compounds, and another of said components being selected from the group consisting of organometal compounds, metal hydrides and metals of Groups I, II and III, at least one of said components containing at least one halogen atom attached to a metal atom, which comprises contacting said polymer present in a hydrocarbon diluent, while the latter is under conditions such that said diluent remains in liquid phase, with a treating agent comprising a dicarbonyl compound and a halogen-containing alkylene oxide of the formula

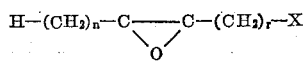

wherein X is a halogen, $n$ is an integer from 0 to 10, and $r$ is an integer from 1 to 10, passing the resulting treated effluent through a solid sorbent bed, and recovering the thus treated polymer substantially free of catalyst residues.

14. The process of claim 13 wherein said dicarbonyl compound comprises a member selected from the group consisting of the following structural formulas:

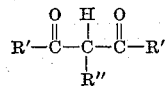

and

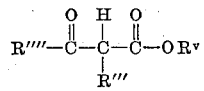

wherein R' is a member of the group consisting of alkyl, cycloalkyl, aryl, aralkyl, alkaryl, alkylcycloalkyl and cycloalkylalkyl and wherein the R''s can be joined to form a cyclic structure; R'' is a member of the group consisting of hydrogen, alkyl, cycloalkyl, aryl, alkaryl, aralkyl, alkylcycloalkyl and cycloalkylalkyl; R''' is a member of the group consisting of alkyl, cycloalkyl, aryl, aralkyl, alkaryl, alkylcycloalkyl, cycloalkylalkyl and an $OR^v$ group; R'''' is a member of the group consisting of hydrogen, alkyl, cycloalkyl, aryl, aralkyl, alkaryl, alkylcycolalkyl and cycloalkylalkyl; and $R^v$ is a member selected from the group consisting of alkyl, cycloalkyl, aryl, aralkyl, alkaryl, alkylcycloalkyl and cycloalkylalkyl, and wherein each of said R', R'', R''', R'''' and $R^v$ contains from 1 to 8 carbon atoms.

15. The process of claim 13 wherein said halogen-containing alkylene oxide is epichlorohydrin, said dicarbonyl compound is acetylacetone, and said solid sorbent is alumina.

No references cited.

JOSEPH L. SCHOFER, *Primary Examiner.*

L. EDELMAN, *Assistant Examiner.*